US012765732B2

(12) United States Patent
Thorne et al.

(10) Patent No.: US 12,765,732 B2
(45) Date of Patent: Oct. 20, 2026

(54) VACUUM CLEANER WITH HAND NOZZLE

(71) Applicant: Origyn LLC, Boston, MA (US)

(72) Inventors: Jason Thorne, Dover, MA (US); Charles S. Brunner, Flemington, NJ (US)

(73) Assignee: Origyn LLC, Wayland, MA (US)

(*) Notice: Subject to any disclaimer, the term of this patent is extended or adjusted under 35 U.S.C. 154(b) by 420 days.

(21) Appl. No.: 18/485,617

(22) Filed: Oct. 12, 2023

(65) Prior Publication Data

US 2024/0130585 A1 Apr. 25, 2024
US 2024/0225390 A9 Jul. 11, 2024

Related U.S. Application Data

(60) Provisional application No. 63/380,114, filed on Oct. 19, 2022.

(51) Int. Cl.
*A47L 9/14* (2006.01)
*A47L 5/22* (2006.01)
(Continued)

(52) U.S. Cl.
CPC ............. *A47L 9/1454* (2013.01); *A47L 5/225* (2013.01); *A47L 5/28* (2013.01); *A47L 5/365* (2013.01); *A47L 9/1409* (2013.01); *A47L 9/248* (2013.01); *A47L 9/2863* (2013.01); *A47L 9/2884* (2013.01); *F16K 7/065* (2013.01)

(58) Field of Classification Search
CPC ........ A47L 9/2863; A47L 9/1454; A47L 5/28; A47L 5/365; A47L 9/1409; A47L 9/248; A47L 9/2884; F16K 7/065
See application file for complete search history.

(56) References Cited

U.S. PATENT DOCUMENTS 4,593,429 A 6/1986 Dyson
4,826,515 A 5/1989 Dyson
(Continued)

FOREIGN PATENT DOCUMENTS

CN 104161485 A * 11/2014
DE 10246675 A1 * 4/2004 .............. A47L 5/28
(Continued)

OTHER PUBLICATIONS

CN 104161485 A - English Machine Translation (Year: 2014).*
(Continued)

*Primary Examiner* — Marc Carlson
(74) *Attorney, Agent, or Firm* — Arcane Law PLLC

(57) ABSTRACT

A vacuum cleaner includes a floor nozzle, a handle, a hand nozzle that can be stored at least partially in the handle, and a backbone between the floor nozzle and the handle. The vacuum cleaner further includes a motor and dustcup on the backbone. Air flow conduits define a first air flow path between the dustcup and the floor nozzle and a second air flow path between the hand nozzle and the dustcup. A flow valve is operable between an open position and a closed position based on the position of the backbone relative to the floor nozzle. When the valve is in the open position, the first air flow path is open to the floor nozzle; when the valve is in the closed position, the first air flow path is closed to the floor nozzle, focusing suction to the hand nozzle.

20 Claims, 14 Drawing Sheets

(51) Int. Cl.

| | |
|---|---|
| *A47L 5/28* | (2006.01) |
| *A47L 5/36* | (2006.01) |
| *A47L 9/24* | (2006.01) |
| *A47L 9/28* | (2006.01) |
| *F16K 7/06* | (2006.01) |

(56) References Cited

U.S. PATENT DOCUMENTS 4,853,008 A 8/1989 Dyson
6,141,826 A 11/2000 Conrad et al.
6,195,835 B1 3/2001 Song et al.
6,334,234 B1 * 1/2002 Conrad ................. A47L 9/0009 15/350
6,572,078 B1 * 6/2003 Thomson ................ F16K 5/184 251/351
8,549,701 B2 * 10/2013 Fujiwara ............... A47L 9/2857 15/331
8,776,306 B2 * 7/2014 Dos Reis ................ A47L 9/244 15/329
9,066,644 B2 * 6/2015 McLuckie ............... A47L 9/244
9,326,653 B2 * 5/2016 White ..................... A47L 9/009
9,591,951 B2 * 3/2017 Rukavina ................ A47L 5/225
10,258,211 B2 4/2019 McLeod
10,376,115 B2 8/2019 Han et al.
10,537,216 B2 1/2020 Conrad
10,869,587 B2 12/2020 Han et al.
10,893,785 B2 1/2021 Crouch et al.
10,966,581 B2 4/2021 Innes et al.
11,135,602 B2 10/2021 Conrad
11,297,987 B2 4/2022 Campbell-Hill
11,382,470 B2 7/2022 Hinchliffe et al.
11,445,875 B2 9/2022 Conrad
11,937,761 B2 * 3/2024 Cheung ................... A47L 9/248
2011/0088210 A1 * 4/2011 White ..................... A47L 9/009 15/410
2011/0094054 A1 * 4/2011 Dos Reis ................ A47L 9/325 15/415.1
2015/0059122 A1 * 3/2015 Kim .......................... A47L 5/28 15/354
2017/0135539 A1 5/2017 Regina
2017/0319026 A1 11/2017 Roschi
2021/0259486 A1 * 8/2021 Conrad ................... A47L 5/365
2021/0290011 A1 9/2021 Conrad
2021/0401248 A1 12/2021 King et al.
2022/0151446 A1 5/2022 Conrad et al.
2024/0130585 A1 * 4/2024 Thorne ..................... A47L 5/32

FOREIGN PATENT DOCUMENTS

DE 20 2005 007 213 U1 9/2005
EP 1 031 312 A1 8/2000
EP 2759243 A1 * 7/2014 ............... A47L 9/02
GB 1059678 2/1967
GB 2578250 A 4/2020
GB 2591588 A 4/2021
GB 2591589 A 4/2021
IE 922912 A1 * 7/1993 ............... A47L 5/32
JP S49 62956 U 6/1974
JP H07 12048 U 2/1995
JP H10 248767 A 9/1998
JP H1119008 A 1/1999
KR 1999-074966 10/1999
KR 20150129563 A * 11/2015 ........... A47L 9/0045
KR 2018 0078076 A 7/2018
WO 01/97673 A1 12/2001
WO 2020/022710 A1 1/2020
WO 2020/184874 A1 9/2020
WO 2022/096854 A1 5/2022

OTHER PUBLICATIONS

European Patent Office, International Search Report and Written Opinion issued in International patent application No. PCT/US2023/025519 (Mar. 3, 2024).
European Patent Office, International Search Report and Written Opinion issued in International patent application No. PCT/US2023/076663 (Feb. 6, 2024).
European Patent Office, International Search Report, issued in International Patent application No. PCT/US2023/025518 (Nov. 7, 2023).
European Patent Office, International Search Report, issued in International Patent application No. PCT/US2023/025517 (Oct. 9, 2023).

* cited by examiner

VACUUM CLEANER WITH HAND NOZZLE

RELATED APPLICATIONS

This application claims the benefit under 35 U.S.C. § 119(e) of U.S. Provisional Patent Application No. 63/380,114 filed on Oct. 19, 2022, the contents of which are incorporated herein by reference in its entirety.

TECHNICAL FIELD

The present disclosure relates generally to vacuum cleaners and more particularly to a vacuum cleaner having a floor nozzle and a hand nozzle.

BACKGROUND

Many types of vacuum cleaners exist, the most common types being upright and stick vacuum cleaners. Upright vacuum cleaners typically combine the motor and floor nozzle into a single assembly and have a handle that extends up from the floor nozzle to support a dustcup or bag. Upright vacuum cleaners traditionally have been known for having a large dustcup capacity and superior suction. Stick vacuum cleaners, on the other hand, have a floor nozzle, a handle that includes the dustcup and motor, and a tube between the floor nozzle and dustcup. The stick vacuum cleaner traditionally has been more lightweight and has a slim design for under-furniture reach, although has reduced dustcup capacity and suction.

SUMMARY

The present disclosure relates to a vacuum cleaner with a hand wand that can be deployed for cleaning crevices and above-floor areas. In some embodiments, the hand wand can be stored in the handle of the vacuum cleaner and may be deployed by itself or together with an extension conduit connected to the handle.

In another aspect, the present disclosure relates to a valve for directing air flow to either the floor nozzle or to the hand nozzle based on the position of the vacuum cleaner's backbone relative to the floor nozzle. For example, when the backbone is in an upright position, the valve is closed to the floor nozzle, thereby focusing suction through the hand nozzle.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the disclosed subject matter.

Figure 1:
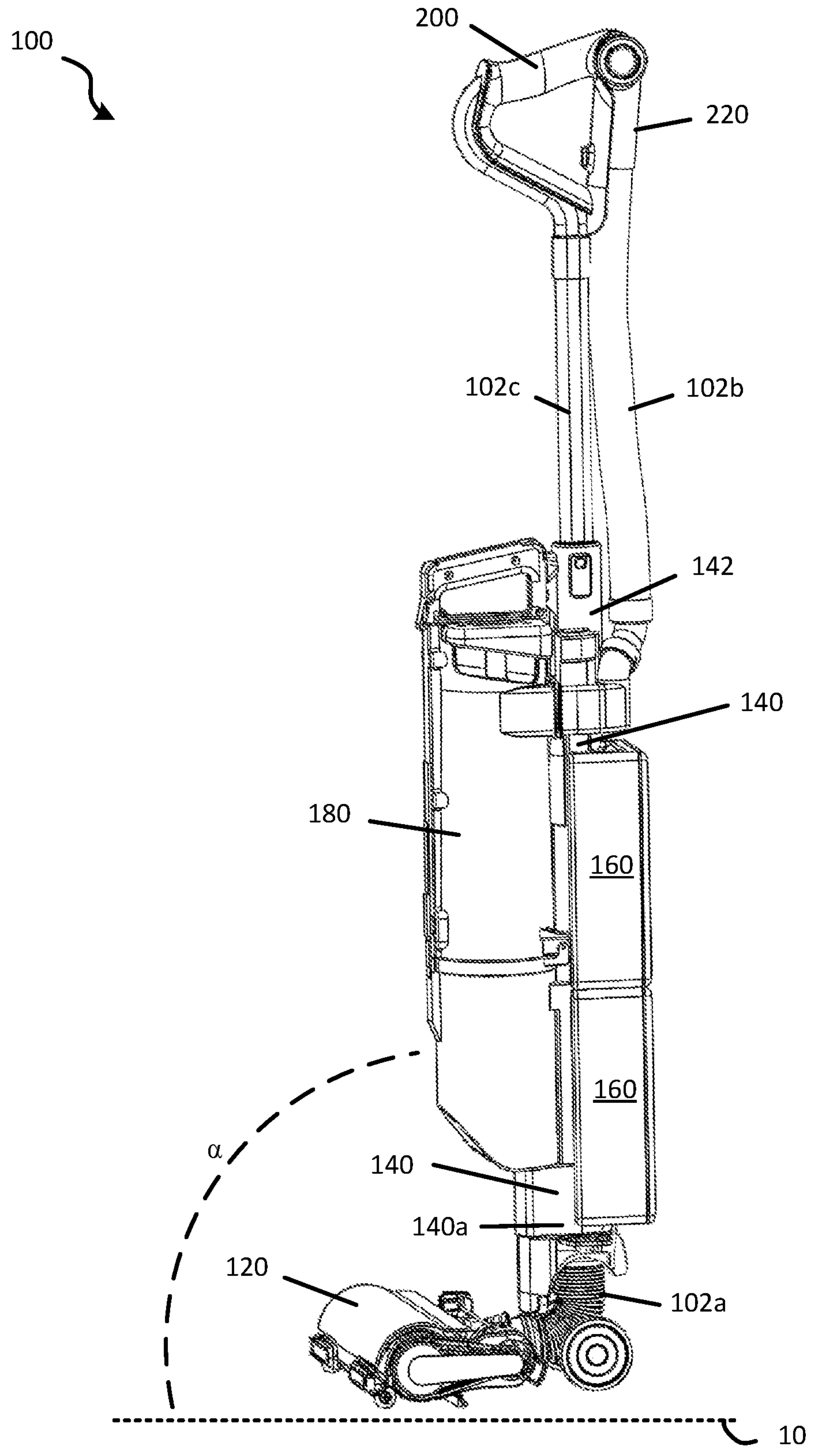
FIG. 1 is a side view of a vacuum cleaner with a backbone oriented in an upright position with respect to the floor nozzle, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Disclosed is a vacuum cleaner comprising a floor nozzle, a handle, a hand nozzle stored at least partially in the handle, and a backbone between the floor nozzle and the handle. The vacuum cleaner further includes a motor and dustcup on the backbone. Air flow conduits define a first air flow path between the dustcup and the floor nozzle and a second air flow path between the hand nozzle and the dustcup. A flow valve is operable between an open position and a closed position based on the position of the backbone relative to the floor nozzle. For example, when the backbone is oriented in an upright position (e.g., 90°±5°) with respect to the floor nozzle, the flow valve is closed. In other positions (e.g., 100° to 180°) the flow valve is open. When the valve is in the open position the first air flow path is open to the floor nozzle and when the valve is in the closed position the first air flow path is substantially closed to the floor nozzle, thereby focusing suction to the hand nozzle. Storing the hand nozzle in the handle closes the second air flow path by the hand nozzle substantially forming a seal with the handle.

In some embodiments, the hand nozzle fluidly communicates with a rigid extension conduit connected to the handle when the hand nozzle is in the stored position. The extension conduit structurally connects the handle to the backbone so that the user can maneuver the vacuum cleaner when using the floor nozzle. On one hand, the user can use the hand nozzle by removing it from the stored position in the handle. Alternately, the user can remove the extension conduit from a receptacle in the top of the backbone and can use the handle to aim the extension conduit to its desired location. Storing the hand nozzle in the handle fluidly connects the hand nozzle to the extension conduit. When the extension conduit is stored in the receptacle on the dustcup, the extension conduit substantially forms a seal with the conduit, preventing air flow through the second air flow path via the hand nozzle.

Overview

One challenge associated with existing stick vacuum cleaners is not having an ability to perform above-floor cleaning. For example, stick vacuum cleaners may be made with a motor and dustcup located at or closely adjacent the handle. By doing so, the vacuum cleaner may omit a hand nozzle due to the position and weight of the motor and dustcup. Another deficiency of existing vacuum cleaners equipped with a hand nozzle is that the suction through the hand nozzle is split between the hand nozzle and the floor nozzle, resulting in insufficient suction. Additionally, the flexible tube for existing hand nozzles is part of the primary air path into the dustcup from the floor nozzle, resulting in power losses. As a result, the tube must be sized larger to accommodate larger debris picked up by the floor nozzle, which increases the overall weight of the vacuum cleaner.

It would be desirable for a compact vacuum cleaner to include a hand nozzle. It would also be desirable for all or a vast majority of suction to pass through the hand nozzle when the hand nozzle is in use and for air flow to not pass through the flexible tube when the hand nozzle is not being used. The present disclosure addresses these needs and others by providing a stick-type vacuum cleaner with a hand nozzle. In one embodiment, the vacuum cleaner includes a valve that closes air flow to the floor nozzle when the backbone is in the upright condition. In such case, suction is directed to the hand nozzle and closed to the floor nozzle. After stowing the hand nozzle, the user may tilt the backbone to its in-use position, opening the valve to the floor nozzle.

Numerous variations and embodiments will be apparent in light of the present disclosure.

Example Embodiments

FIG. 1 illustrates a side view of a vacuum cleaner 100 with a floor nozzle 120, backbone 140 with battery packs 160 and dustcup 180, and handle 200 with hand nozzle 220, in accordance with an embodiment of the present disclosure. In this example, the floor nozzle 120 is on a horizontal surface or floor 10 and the backbone 140 is in an upright position. In the upright position, the backbone 140 is substantially oriented at 90° (e.g., ±5°) to the floor 10. The hand nozzle 220 is shown in a stored condition with part of the hand nozzle 220 received in the handle 200.

The vacuum cleaner 100 includes a plurality of conduits 102*a*, 102*b*, 102*c* (collectively or generally, conduits 102) that define a first air flow path between the floor nozzle 120 and the dustcup 180, and a second air flow path between the hand nozzle 220 and the dustcup 180. In this example, a first flexible conduit 102*a* extends from the floor nozzle 120, through a pivot joint, and towards a base 140*a* of the backbone 140. The flexibility of the first flexible conduit 102*a* accommodates various positions of the backbone 140 with respect to the floor nozzle 120, including the upright position (e.g., as shown) and other positions in which the backbone 140 defines an angle from 85° to 180° with the floor 10 (and floor nozzle 120), for example. The backbone 140 can define or include a conduit between the first flexible conduit 102*a* and the dustcup 180. A second flexible conduit 102*b* extends between the backbone 140 and the hand nozzle 220. The handle 200 includes or is connected to a rigid conduit 102*c* that extends between the backbone 140 and the handle 200. A distal end of the rigid conduit 102*c* is received in a receptacle 142 at the top of the backbone 140. The receptacle 142 can be a dead end such that when the hand nozzle 220 is in the stowed position and the rigid conduit 102*c* is received in the receptacle 142, the second air flow path is closed at one end. For example, the rigid conduit 102*c* forms a seal with the receptacle 142 (a dead end) and the hand nozzle 220 forms a seal with the handle 200.

In some embodiments, the air flow through the first and/or second air flow paths is determined, at least in part, by the orientation of the backbone 140 with respect to the floor nozzle 120. For example, the first flexible conduit 102*a* between the floor nozzle 120 and the base 140*a* of the backbone 140 includes a valve 144 (not visible), such as a pinch valve, that is closed when the backbone is in the upright position. In some embodiments, the valve 144 is closed or substantially closed (e.g., at least 90% flow restriction) when the backbone 140 is substantially upright (e.g., 90°±5°). Thus, when the user removes the hand nozzle 220 from the handle 200 or the rigid conduit 102*c* from the receptacle 142, air flow to the dustcup 180 takes the path of least resistance and flow is concentrated through the hand nozzle 220.

In some embodiments, the air flow through the first and/or second air flow paths can be determined, at least in part, by a position of the handle 200 with respect to the backbone 140. For example, the handle 200 can telescope between a retracted or compact position and a deployed or extended position, where moving the handle 200 to the retracted position closes the first air flow path to the floor nozzle 120 and opens the second air flow path to the hand nozzle 220, and where moving the handle 200 to the deployed position (e.g., as shown in FIG. 1) closes the second air flow path to the hand nozzle 220 and opens the first air flow path to the floor nozzle 120.

Figure 2:
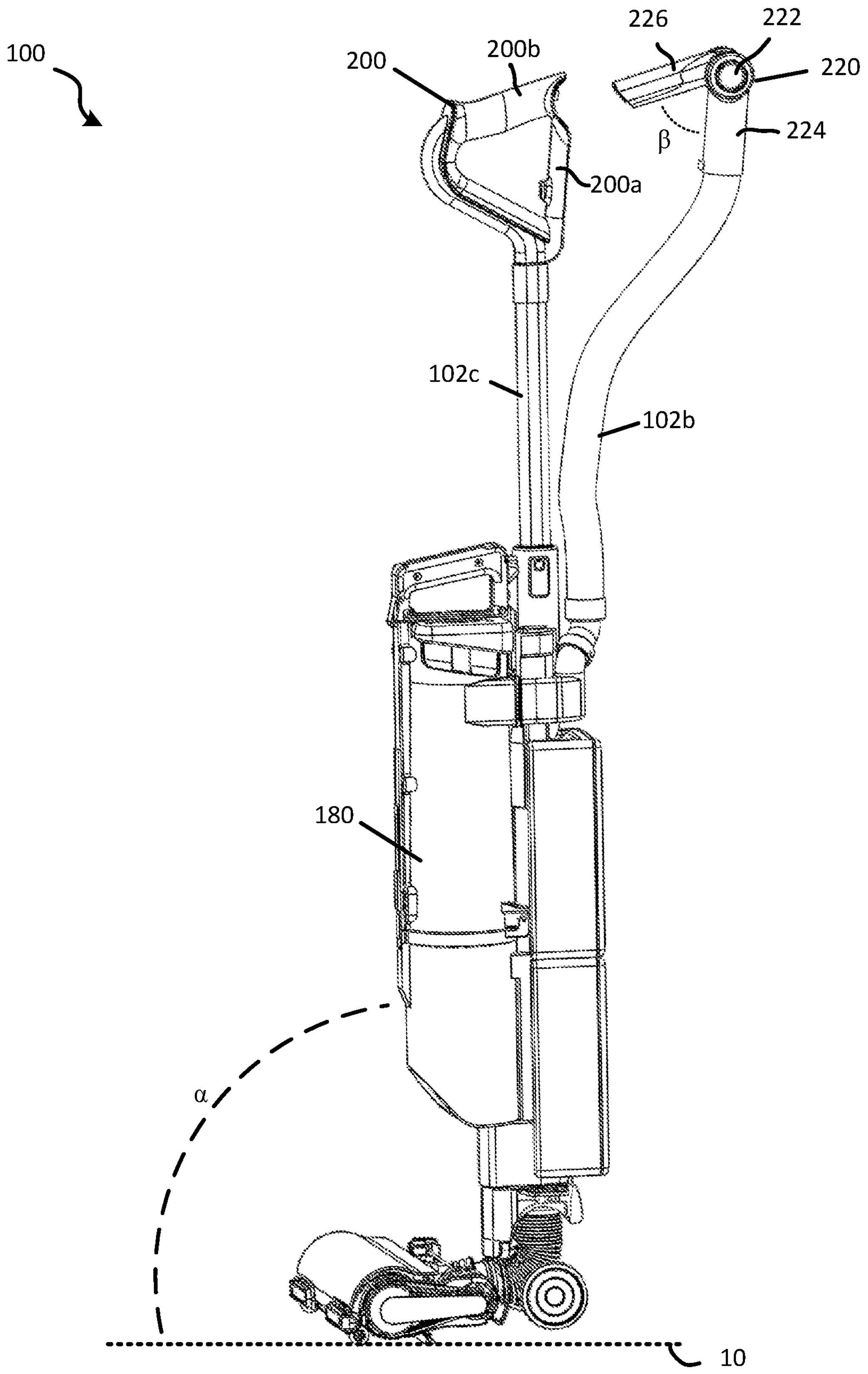
FIG. 2 is a side view of the vacuum cleaner of FIG. 1 with the hand nozzle deployed from the handle, in accordance with an embodiment of the present disclosure.
Figure 3:
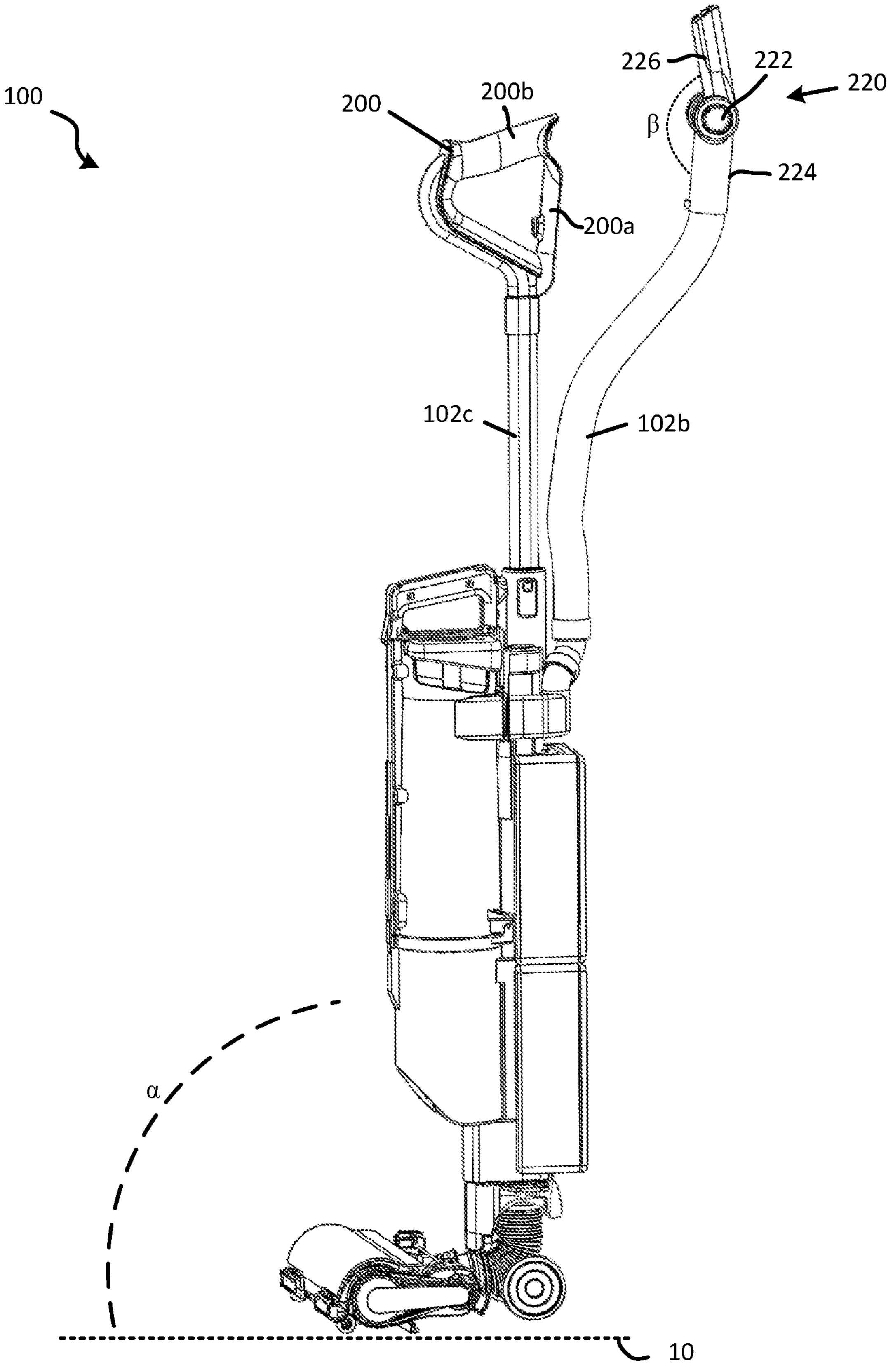
FIG. 3 is a side view of the vacuum cleaner of FIG. 1 with the hand nozzle pivoted during use via a pivot joint in the hand nozzle, in accordance with an embodiment of the present disclosure.

FIGS. 2 and 3 illustrate side views of the vacuum cleaner 100 of FIG. 1 with the backbone 140 in the upright position and the hand nozzle 220 in a deployed position, in accordance with an embodiment of the present disclosure. In these examples the hand nozzle 220 includes a first rigid section 224 and a second rigid section 226 oriented transversely to the first rigid section 224 to define angle β from 60° to 100°, such as about 75° when in the stowed position (e.g., as shown in FIG. 2). When stowed in the handle 200 (e.g., shown in FIG. 1), the first rigid section 224 abuts and is partly received in a half channel defined by a vertical portion 200*a* of the handle 200 where it can function as part of the handle 200 for lifting or moving the vacuum cleaner 100. The second rigid section 226 is received in a hollow horizontal or generally horizontal portion 200*b* and forms a seal with the handle 200, which fluidly communicates with the rigid conduit 102*c*. Here, the hand nozzle 220 includes a pivot joint 222 between the first and second rigid sections 224, 226, enabling the user to pivot the second rigid section 226 as desired for a particular cleaning task.

Figure 4:
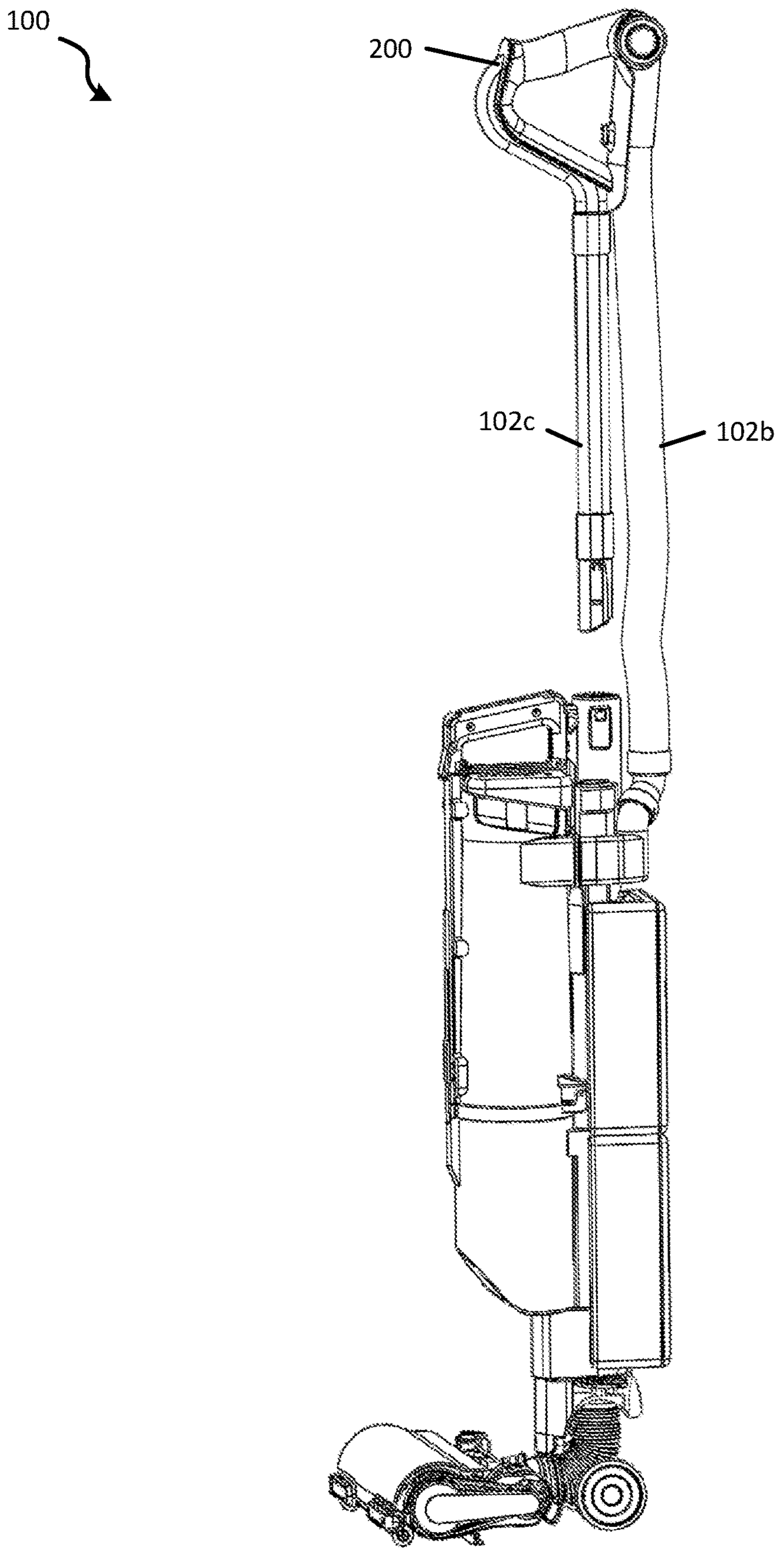
FIG. 4 is a side view of the vacuum cleaner of FIG. 1 with an extension conduit of the hand nozzle removed from its storage receptacle, in accordance with an embodiment of the present disclosure.
Figure 5:
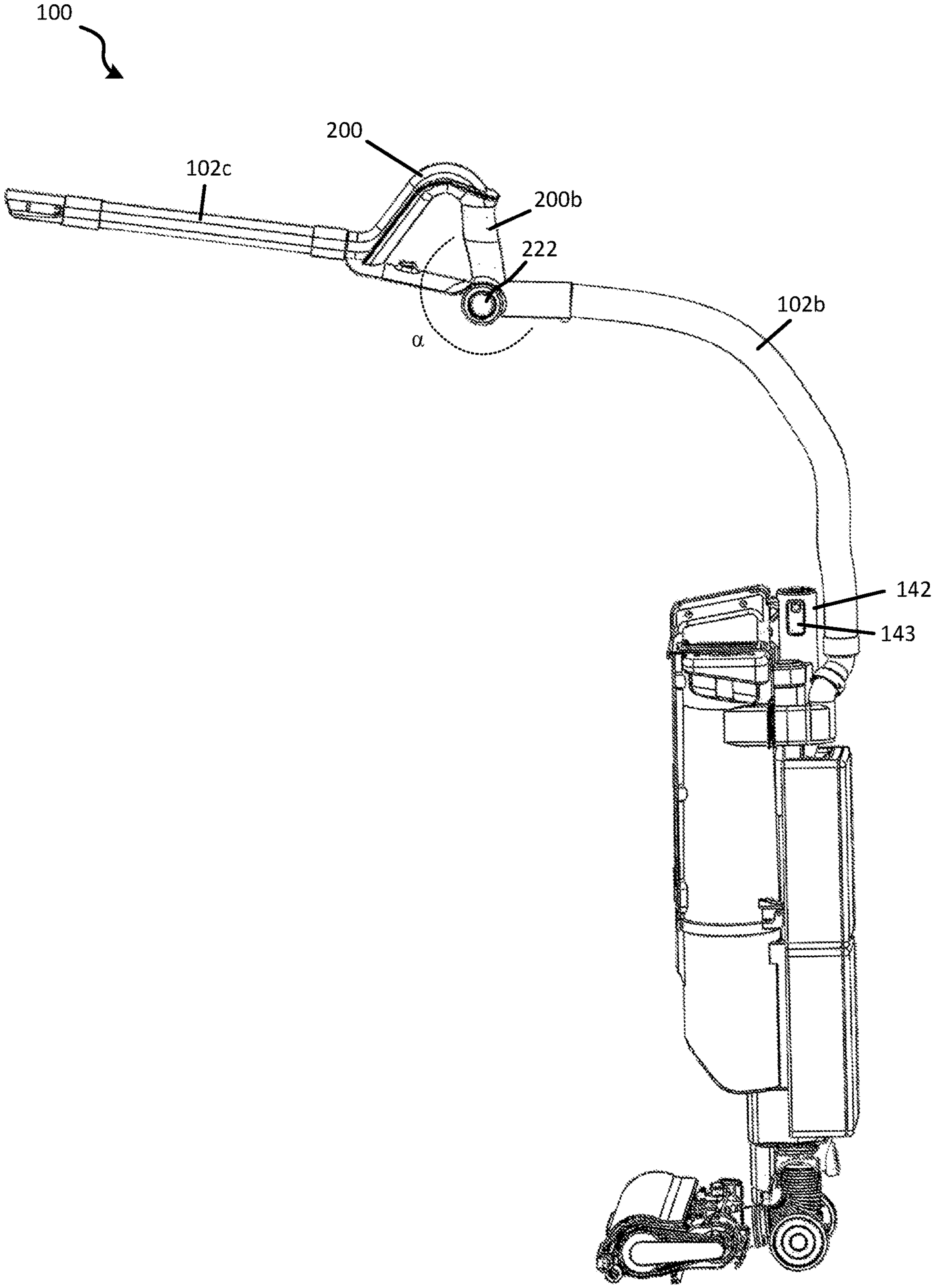
FIG. 5 is a side view of the vacuum cleaner of FIG. 4 with the hand nozzle and extension conduit in use, in accordance with an embodiment of the present disclosure.

FIGS. 4 and 5 illustrate side views of a vacuum cleaner 100 with the backbone 140 in an upright position and the hand nozzle 220 in a deployed position together with the handle 200 and rigid conduit 102*c*, in accordance with an embodiment of the present disclosure. The rigid conduit 102*c* has been removed from the receptacle 142 at the top of the backbone 140, such as by pressing a release button or catch 143 and pulling upward on the handle 200. The rigid conduit 102*c* fluidly connects to the handle and provides an extension of the hand nozzle 220. In use, the pivot joint 222 enables the user to use the previously horizontal portion 200*b* of the handle 200 as a grip to direct the rigid conduit 102*c* to the desired location.

Figure 6:
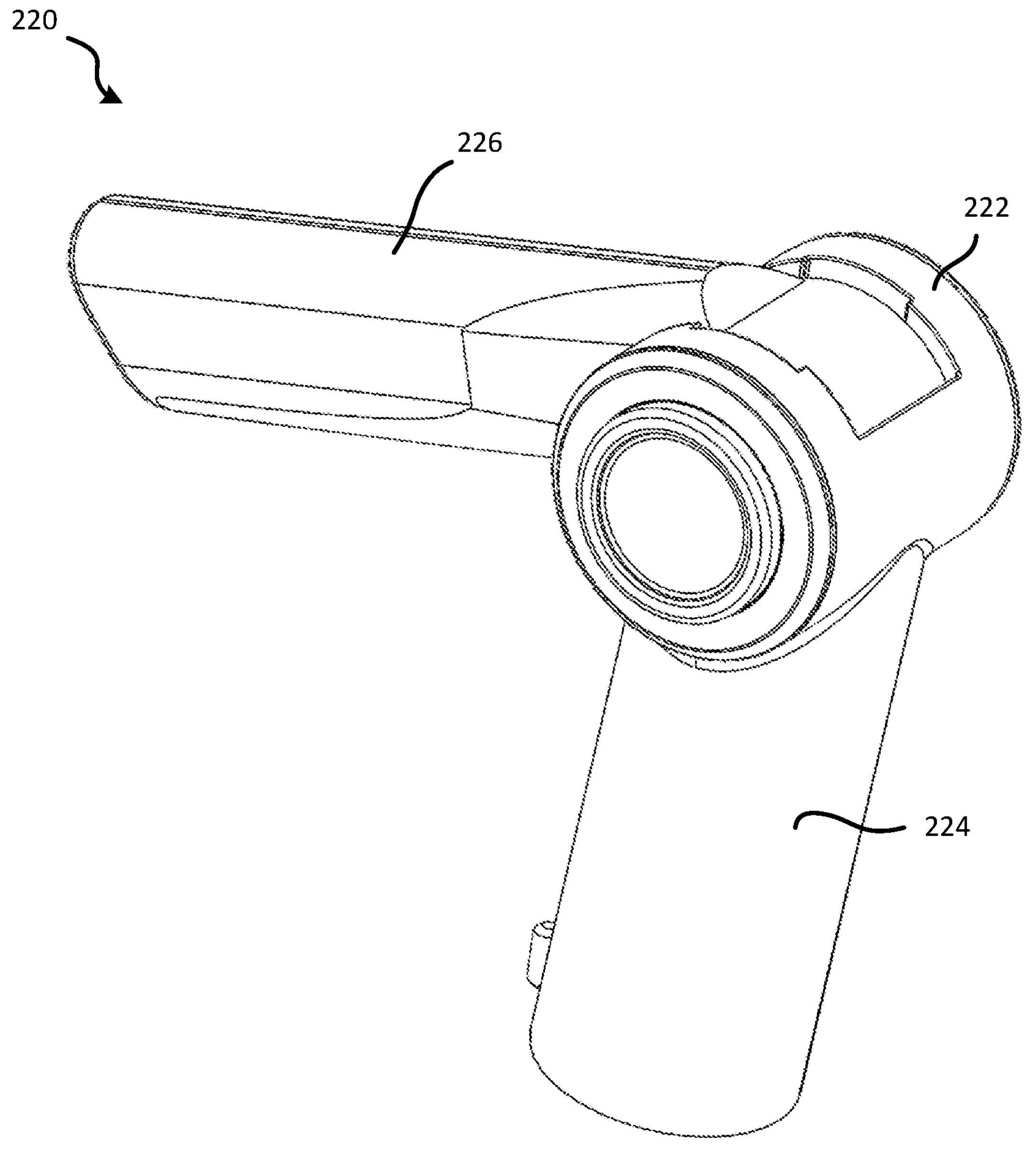
FIG. 6 is a side and rear perspective view showing a hand nozzle, in accordance with an embodiment of the present disclosure.

FIG. 6 illustrates a top and rear perspective view of a hand nozzle 220, in accordance with an embodiment of the present disclosure. The hand nozzle 220 includes first rigid section 224 and second rigid section 226 joined at a pivot joint 222 that includes part of the air flow path. In one embodiment, the first rigid section 224 has a cylindrical geometry and the second rigid section 226 a flattened cylinder shape, such as an elliptical or rectangular cross-sectional shape.

Figure 7:
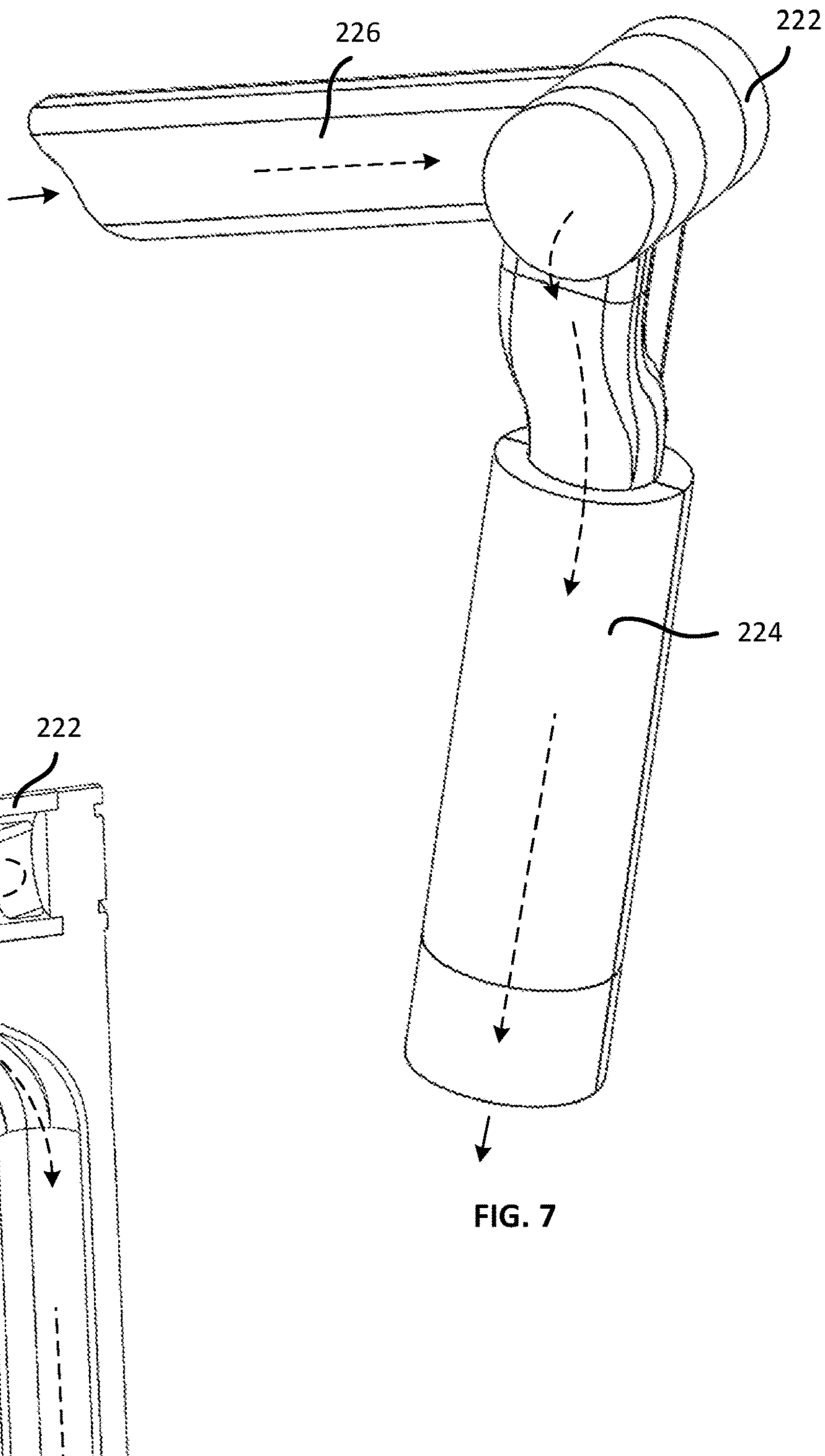
FIG. 7 is a side view of a hand nozzle with pivot joint, in accordance with an embodiment of the present disclosure.
Figure 8:
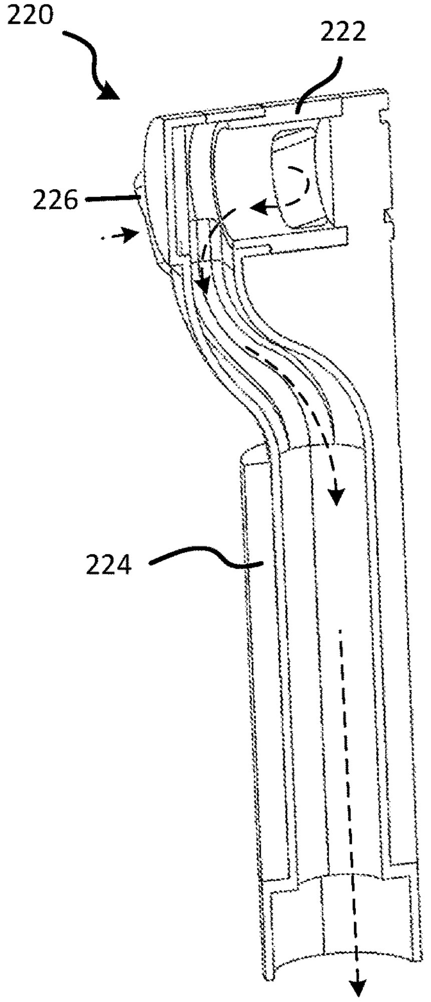
FIG. 8 is a rear, cross-sectional view of the hand nozzle of FIG. 7 and shows example air flow paths through the hand nozzle, in accordance with an embodiment of the present disclosure.

FIG. 7 illustrates a side view and FIG. 8 illustrates a rear cross-sectional view of a hand nozzle 220, in accordance with another embodiment of the present disclosure. Air flow is shown using broken lines. The hand nozzle 220 includes first rigid section 224 and second rigid section 226 joined at a pivot joint 222 that includes part of the air flow path, similar to embodiments discussed above. In one embodiment, the first rigid section 224 has a cylindrical geometry and the second rigid section 226 a flattened cylinder shape, such as an elliptical or rectangular cross-sectional shape. As can be seen in FIG. 8, part of the air flow passes laterally through the pivot joint 222 between the first and second rigid sections 224, 226.

Figure 9:
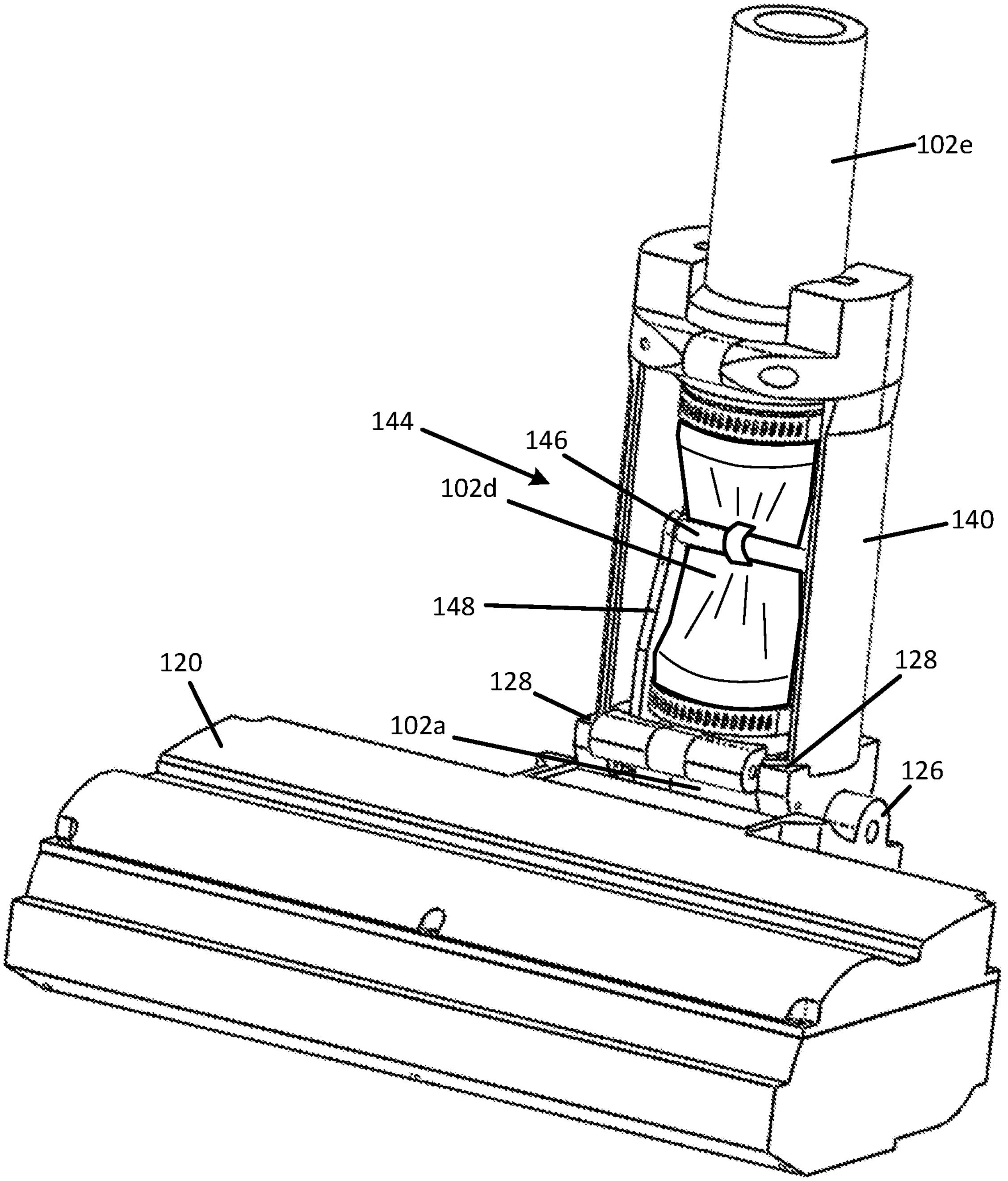
FIG. 9 is a front perspective view of a model of a vacuum cleaner showing the floor nozzle and a pinch valve in a closed position, in accordance with an embodiment of the present disclosure.
Figure 10:
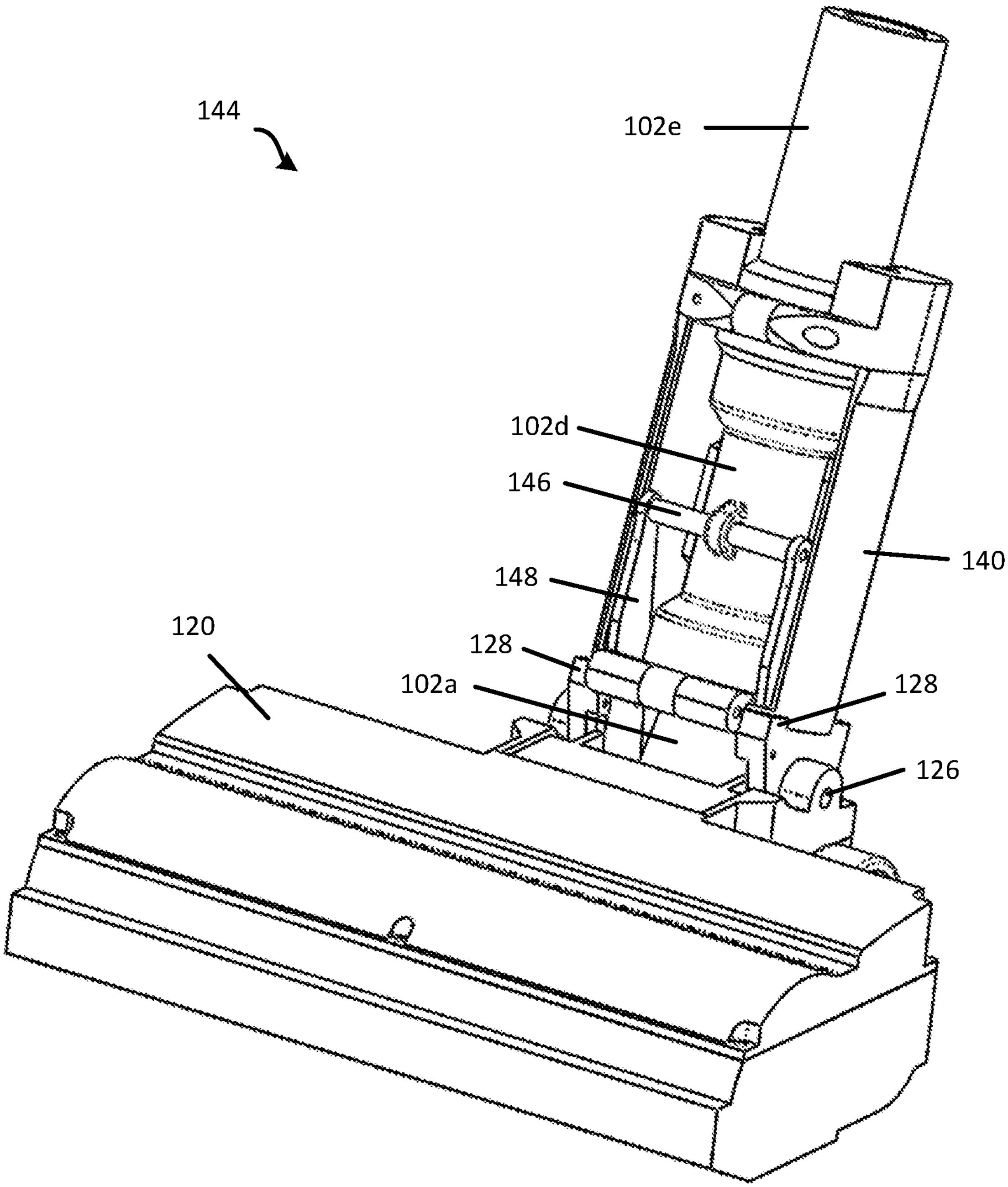
FIG. 10 is a front view of the floor nozzle and pinch valve shown in FIG. 9 with the valve in an open position, in accordance with an embodiment of the present disclosure.

FIGS. 9 and 10 show a side and front perspective views, respectively, of a valve 144 configured as a pinch valve, in accordance with an embodiment of the present disclosure. In FIG. 9 the backbone 140 is in an upright position with respect to the floor nozzle 120. The valve 144 is shown in the closed position in FIG. 9 and is shown in an open position in FIG. 10. A length of flexible conduit 102*d* is between the floor nozzle 120 and a conduit 102*e* extending through or connecting to the backbone 140. In one example, the flexible conduit 102*d* is housed within a lower portion of the backbone 140, such as being positioned above the hinge 126 and below the dustcup 180 (shown in FIG. 1). The flexible conduit 102*d* is shown as connecting to the first flexible conduit 102*a*, but it can continue to the floor nozzle 120 in place of the first flexible conduit 102*a* in some embodiments. In this example, the valve 144 is configured as a pinch valve that includes a pinch bar 146 configured to pivot against the flexible conduit 102*d*, closing the air flow pathway through it. In this example, the pinch bar 146 is attached at its ends to a yoke 148 that is pivotably connected to the hinge 126 or pivot point between the floor nozzle 120 and backbone 140. As the backbone 140 moves towards the upright position, the yoke 148 contacts stops 128 that prevent further pivot of the yoke 148 as the backbone 140 proceeds to the upright position, causing the pinch bar 146 to collapse the flexible conduit 102*d*. To ensure the flexible conduit 102*d* returns to the open position when moving the backbone 140 to the in-use position, the flexible conduit 102*d* optionally includes a loop 145 around the pinch bar 146.

Figure 11:
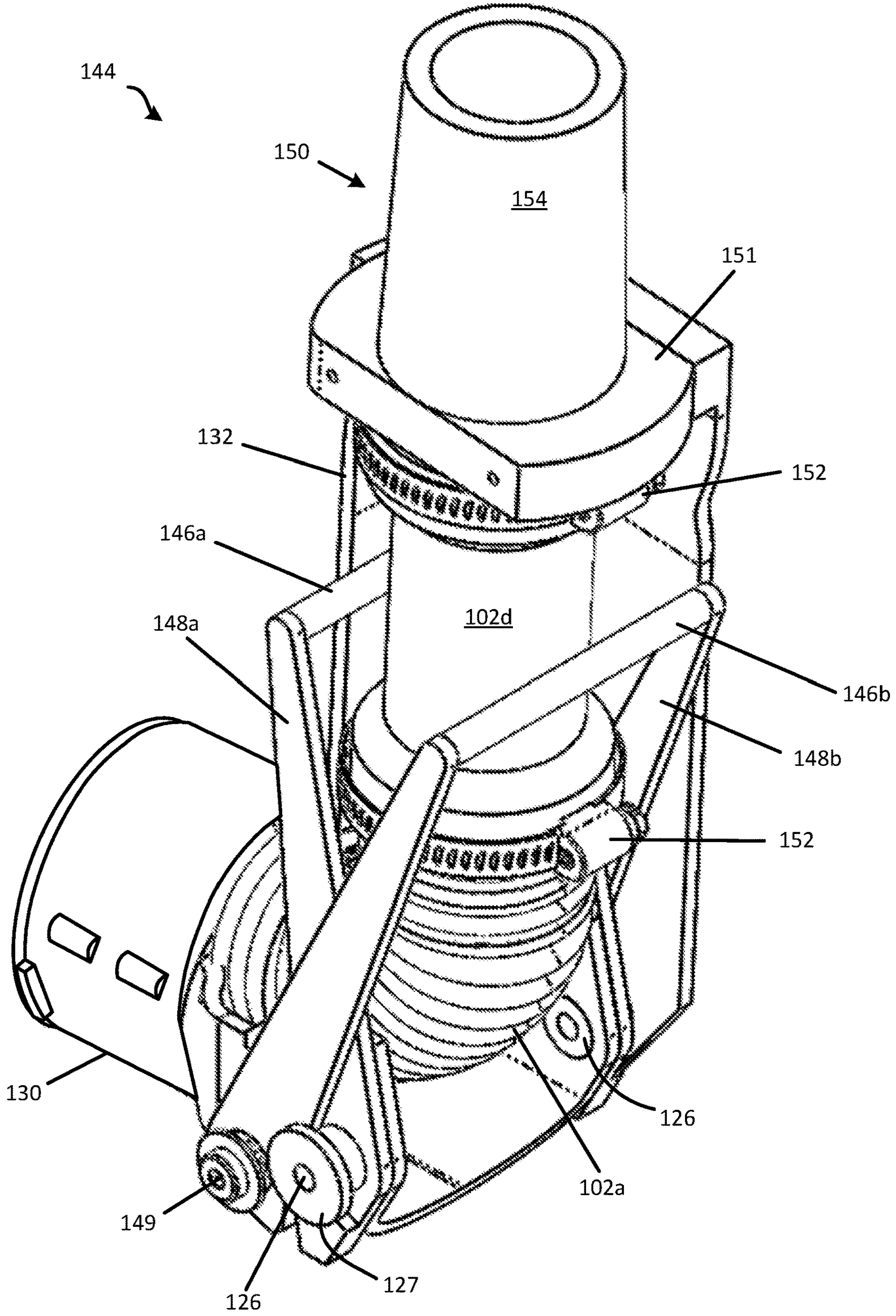
FIG. 11 is a side and rear perspective view showing components of a vacuum cleaner and valve where the valve is in an open position, in accordance with an embodiment of the present disclosure.
Figure 12:
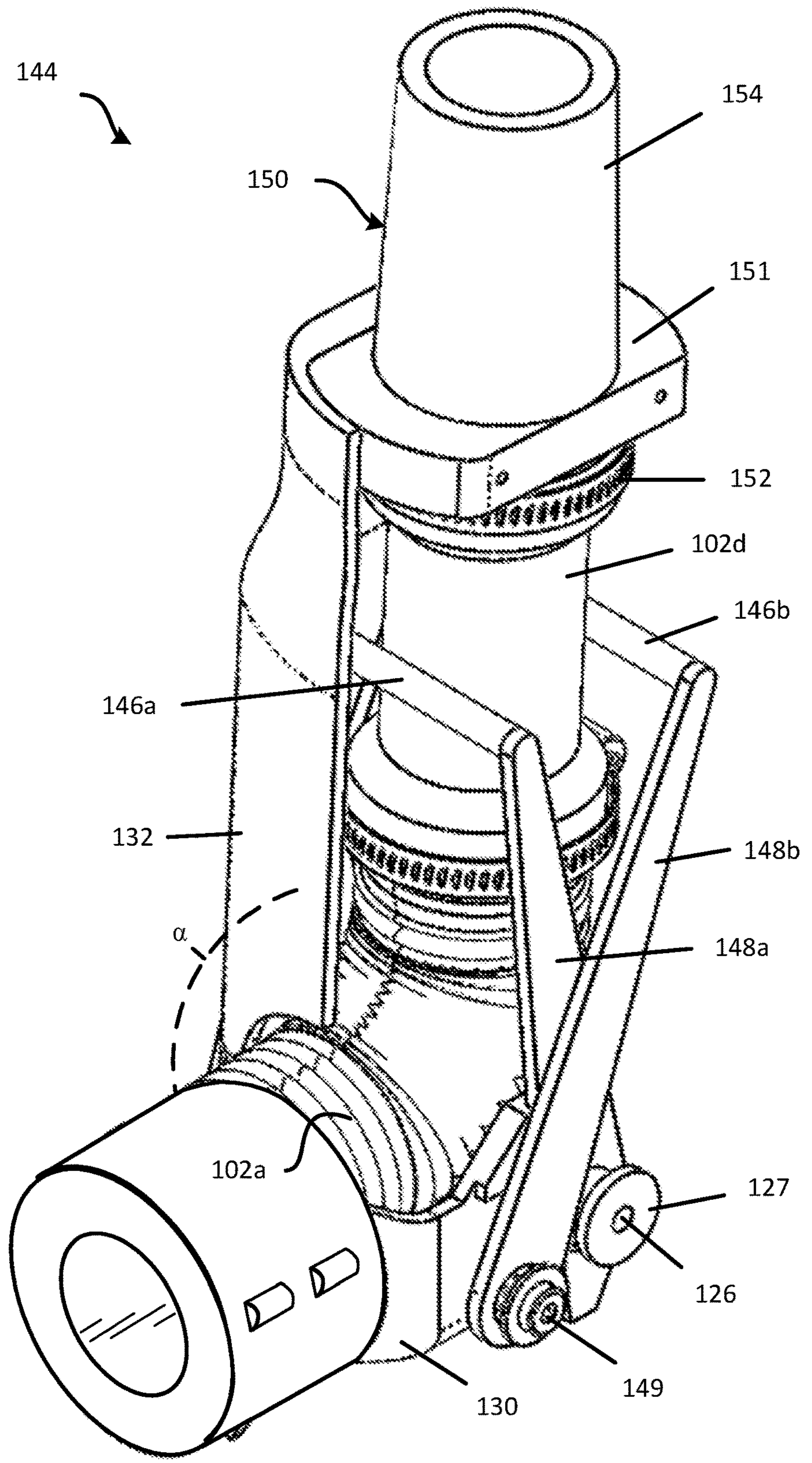
FIG. 12 is a top and front perspective view of the components and valve shown in FIG. 11.
Figure 13:
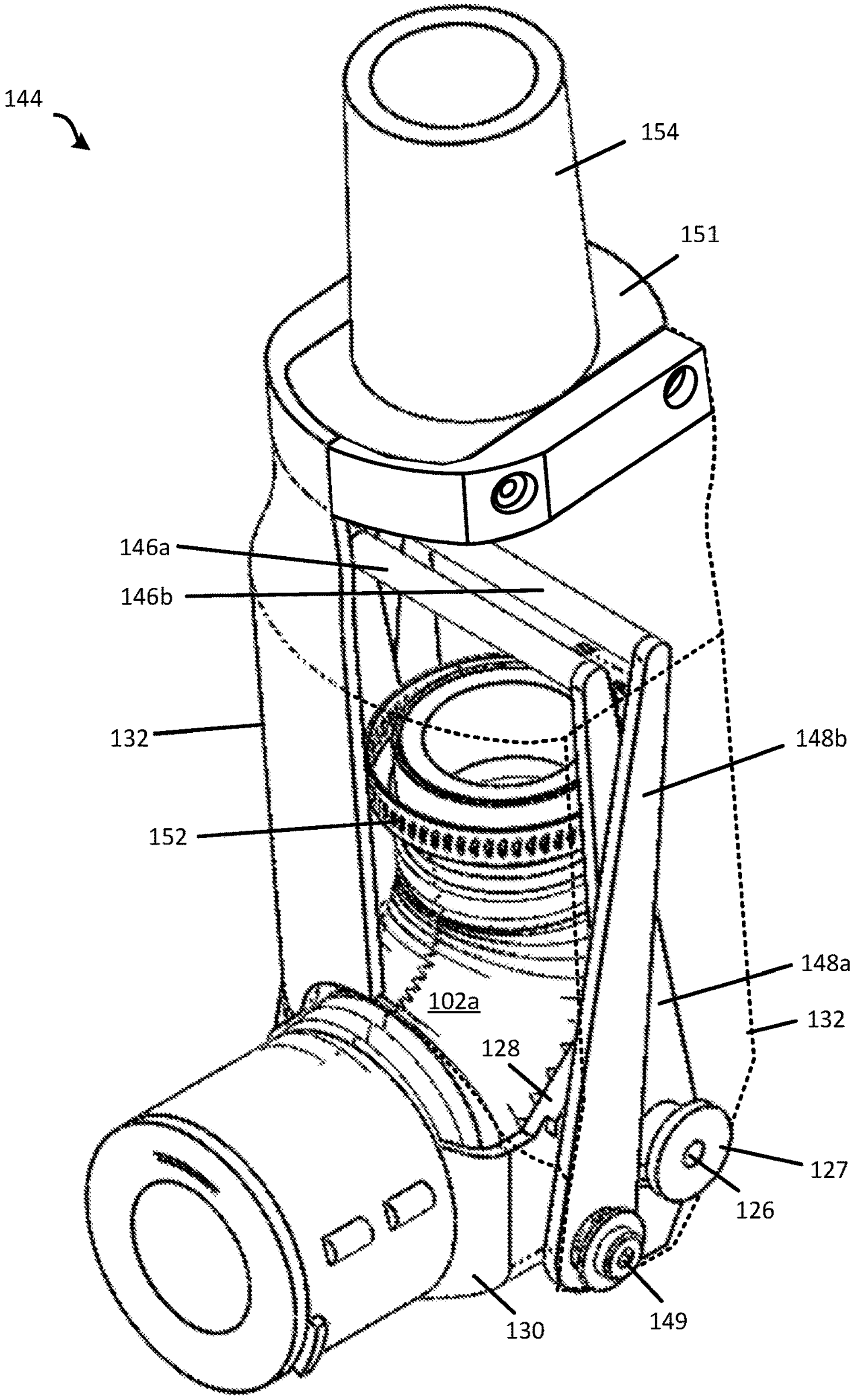
FIG. 13 is a front and side perspective view showing bars of a pinch valve in a closed position (flexible conduit omitted for clarity), in accordance with an embodiment of the present disclosure.
Figure 14:
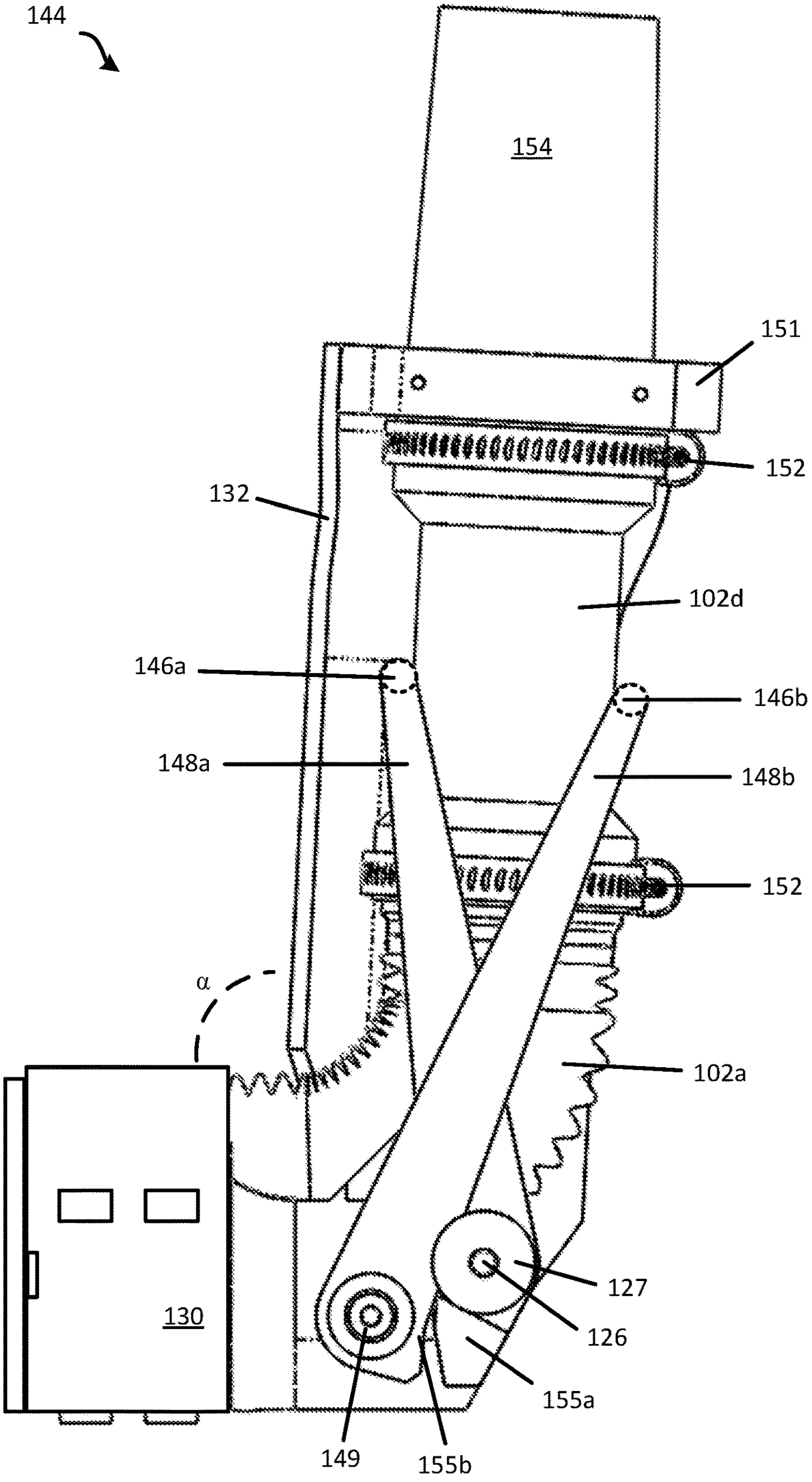
FIG. 14 is a side view showing components of the vacuum cleaner and valve with the valve in an open position, in accordance with an embodiment of the present disclosure.
Figure 15:
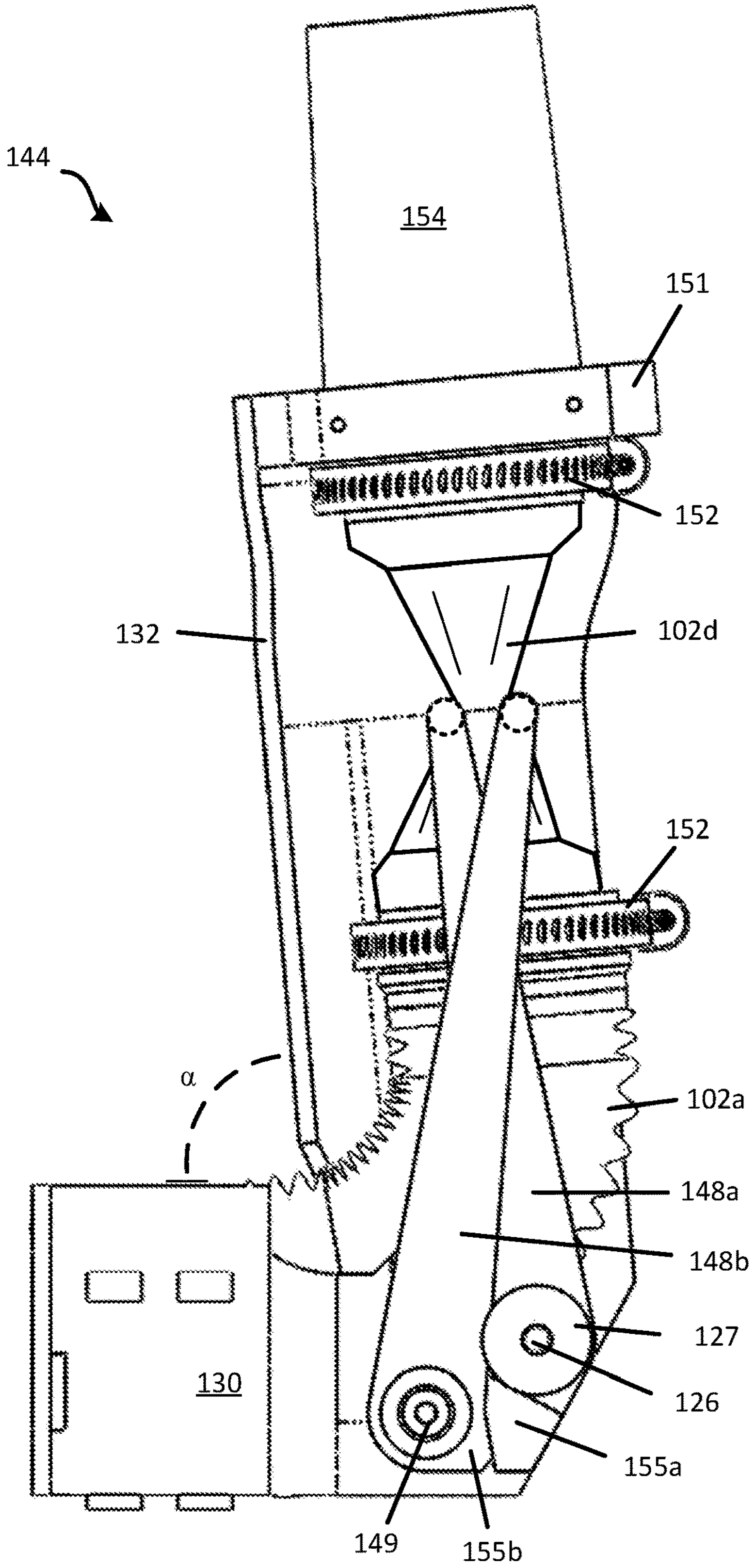
FIG. 15 is a side view showing the valve assembly of FIG. 14 with the valve in a closed position, in accordance with an embodiment of the present disclosure.

Referring now to FIGS. 11-15, a valve 144 configured as a scissor-type pinch valve is shown in various views, in accordance with an embodiment of the present disclosure. FIG. 11 is a top, rear, and side view showing the valve 144 in an open position; FIG. 12 is a top, front, and side view showing the valve 144 in an open position; FIG. 13 is a side and front perspective view showing the valve 144 in a closed position where the flexible conduit 102*d* is omitted to more clearly show other components of the valve 144; FIGS. 14 and 15 are side views showing the valve 144 in open and closed positions, respectively. Note that in FIG. 15 the flexible conduit 102*d* is illustrated in an uncompressed or open state rather than being pinched closed between the valve 144 as it would be during operation of the valve 144. The closed position of the flexible conduit 102*d* is illustrated in broken lines. FIGS. 11-15 will be discussed concurrently below.

As noted above, the valve 144 is configured as a scissor-type pinch valve and includes a first pinch bar 146*a* on a first yoke 148*a* and a second pinch bar 146*b* on a second yoke 148*b*, where each pinch bar 146 extends laterally between arms of the respective yoke 148. Each pinch bar 146 can be a roller in some embodiments. A length of flexible conduit 102*d* is between the first and second pinch bars 146*a*, 146*b*. In this example, the flexible conduit 102*d* connects to another flexible conduit 102*a*, which extends at least partially through the first and second frame portions 130, 132 between the floor nozzle 120 and the backbone 140 (shown, e.g., in FIGS. 1 and 10).

The first frame portion 130 is pivotably connected to a second frame portion 132 at a pivot point or hinge 126. The first and second frame portions 130, 132 can be made of rigid materials such as metal or plastic. The first frame portion 130 is generally oriented in a horizontal position and connects to the floor nozzle 120. The second frame portion 132 extends from the first frame portion 130 to define an angle α from 0° to about 100°. As shown in FIGS. 11-15, the first frame portion 130 is oriented at an angle α from about 80° to about 100°. It will be appreciated that the second frame portion 132 can pivot downward so that the angle α between these components is larger, such as an angle α of 120°, 135°, or even 180°. The second frame portion 132 can be part of the backbone 140 or can connect to the backbone 140. In some embodiments, the flexible conduit 102*d* fluidly connects to the backbone 140 using a connector 150, such as a tubing connector having a slip fit, compression fitting, weld, adhesive, clamp, or other suitable connection.

In this example, the connector 150 connects to the flexible conduit 102*d* using a hose clamp 152 and has a tapered section 154 that can be received in the conduit of the backbone 140. An upper end portion of the second frame portion 132 is secured to a body 151 of the connector 150, such as by fasteners. As a result, the second frame portion 132 pivots together with the backbone 140 during use of the vacuum cleaner 100. The flexible conduit 102*d* is also secured to the flexible conduit 102*a* using a hose clamp 152.

The first yoke 148*a* of the first pinch bar 146*a* is attached to the first frame portion 130 at the pivot or hinge 126, such as a fastener, bushing, or other connection. The second yoke 148*b* of the second pinch bar 146*b* is attached to the second frame portion 132 by a fastener 149. The first yoke 148*a* crosses the second yoke 148*b*. In some embodiments, one or both yokes 148 are pivotably connected to the respective frame portion. In other embodiments, yokes 148*a*, 148*b* are fixedly attached to the respective frame portion 130, 132. As the second frame portion 132 is moved to an upright position, such as an angle α from ~85°-95° with the first frame portion 132, the second yoke 148*b* contacts the pivot fastener 127 and the first yoke 148*a* contacts stops 128 on the first frame portion 130 to cause the pinch bars 146 to move towards one another (e.g., as shown in FIG. 13) and squeeze closed the flexible conduit 102*d*.

FIGS. 14 and 15 illustrate the valve 144 in an open position and a closed position, respectively. In FIG. 14, the second frame portion forms an angle α of about 95° with the first frame portion 130. As a result, the first yoke 148*a* and second yoke 148*b* remain in an open position, thereby permitting the flexible conduit 102*d* to be open for air flow therethrough. In FIG. 15, the second frame portion 132 has moved to the upright position and slightly beyond, where the angle α between the first frame portion 130 and second frame portion 132 is about 85°. In this position, the first and second yokes 148*a*, 148*b* have pivoted towards one another, closing the first and second pinch bars 146*a*, 146*b* on the flexible conduit 102*d*, closing it (as shown in broken lines). In moving to the position shown in FIG. 15, first yoke 148*a* rotates until making contact with the first frame portion 130, such as at stops 128 (shown in FIG. 13). As the second frame portion 132 rotates about pivot 126, a base 155*a* of the first yoke 148*a* contacts the base 155*b* of the second yoke 148*b* and functions as a cam to pivot the second yoke 148*b* at a greater rotational rate. As a result, the first and second pinch bars 146*a*, 146*b* move towards one another to close the flexible conduit 102*d*. Other mechanisms can be used to close the pinch bar(s) 146. Loop 145 discussed above can be similarly employed in the embodiment shown in FIGS. 11-15.

Further Example Embodiments

The following examples pertain to further embodiments, from which numerous permutations and configurations will be apparent.

Example 1 is a vacuum cleaner comprising a floor nozzle, a handle, a hand nozzle stored at least partially in the handle, and a backbone between the floor nozzle and the handle. The vacuum cleaner further includes a motor and dustcup on the backbone. A flow valve is operable between an open position and a closed position based on the position of the backbone relative to the floor nozzle. Air flow conduits define a first air flow path between the dustcup and the floor nozzle and a second air flow path between the hand nozzle and the dustcup. When the valve is in the open position the first air flow path is open to the floor nozzle and when the valve is in the closed position the first air flow path is substantially closed to the floor nozzle. In some such embodiments, air flow through the hand nozzle is closed or substantially closed when the hand nozzle is not in use.

Example 2 includes the vacuum cleaner of Example 1, where the valve is located at a pivot between the floor nozzle and the backbone. In one such embodiment, the valve is located closely adjacent a pivot between the floor nozzle and the backbone.

Example 3 includes the vacuum cleaner of Example 1, where the valve is located closely adjacent to the inlet of the dustcup.

Example 4 includes the vacuum cleaner of Example 2 or 3, where, with the floor nozzle on a horizontal surface, orienting the backbone in an upright position (e.g., 90°±5°) substantially closes the valve and orienting the backbone at a position from 100° to 180° relative to the horizontal surface opens the valve.

Example 5 includes the vacuum cleaner of Example 4, where orienting the backbone at a position from 110° to 180° results in the valve being fully open.

Example 6 includes the vacuum cleaner of any of Examples 1-5, wherein the valve is a pinch valve.

Example 7 includes the vacuum cleaner of Example 6, wherein the pinch valve has a scissor movement.

Example 8 includes the vacuum cleaner of Example 6 or 7, wherein the pinch valve acts on a flexible segment of the first air flow path.

Example 9 includes the vacuum cleaner of Example 8, wherein the flexible segment is made of silicone.

Example 10 includes the vacuum cleaner of any of Examples 6-9, wherein a pivot between the backbone and the floor nozzle comprises a first frame portion coupled to the floor nozzle and a second frame portion coupled to the backbone, wherein the second frame portion is pivotably connected to the first frame portion, and wherein the pinch valve includes first and second bars each connected to one of the first or second frame portions.

Example 11 includes the vacuum cleaner of Example 10, wherein the first bar is pivotably connected to the first frame portion via a first yoke and/or the second bar is pivotably connected to the second frame portion via a second yoke.

Example 12 includes the vacuum cleaner of Example 10 or 11, wherein pivoting the first frame portion with respect to the second frame portion moves the first and second bars between open and closed positions on the flexible segment.

Example 13 includes the vacuum cleaner of any one of Examples 1-12, wherein the air flow conduits include a flexible conduit between the dustcup and the hand nozzle.

Example 14 includes the vacuum cleaner of any one of Examples 1-13, wherein the hand nozzle includes a pivot joint between a first rigid section and a second rigid section, and wherein the second rigid section is received in the handle in a stored configuration.

Example 15 includes the vacuum cleaner of Example 14, wherein the second air flow path includes a passageway through the pivot joint of the hand nozzle.

Example 16 includes the vacuum cleaner of any one of Examples 13-15, wherein the air flow conduits include a rigid conduit connected to the handle with the rigid conduit in fluid communication with the hand nozzle via part of the handle when the hand nozzle is in the handle.

Example 17 includes the vacuum cleaner of Example 16, wherein an upper end portion of the backbone defines a receptacle configured to receive a distal end portion of the rigid conduit so that during use the rigid conduit rigidly couples the handle to the backbone.

Example 18 includes the vacuum cleaner of Example 17, wherein the receptacle is a dead end to the second air flow path.

Example 19 includes the vacuum cleaner of any one of Examples 1-18, wherein the vacuum cleaner is battery powered.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

The invention claimed is:

1. A vacuum cleaner comprising:

a floor nozzle;

a handle;

a hand nozzle stored at least partially in the handle;

a backbone between the floor nozzle and the handle;
a motor on the backbone;
a dustcup on the backbone, the dustcup having an inlet;
a pinch valve between the floor nozzle and the inlet to the dustcup, the pinch valve operable between an open position and a closed position; and
air flow conduits defining a first air flow path between the dustcup and the floor nozzle and a second air flow path between the hand nozzle and the dustcup;
wherein, when the pinch valve is in the open position, the first air flow path is open to the floor nozzle and, when the pinch valve is in the closed position, the first air flow path is closed to the floor nozzle.

2. The vacuum cleaner of claim 1, wherein the pinch valve is at or closely adjacent to a pivot between the floor nozzle and the backbone.

3. The vacuum cleaner of claim 2, wherein, when the floor nozzle is on a horizontal surface, orienting the backbone in an upright position closes the pinch valve and orienting the backbone at a position from 100° to 180° relative to the horizontal surface opens the pinch valve.

4. The vacuum cleaner of claim 3, wherein the pinch valve is fully open when the backbone is oriented at a position from 110° to 180° relative to the horizontal surface.

5. The vacuum cleaner of claim 1, wherein the pinch valve is located closely adjacent to the inlet to the dustcup.

6. The vacuum cleaner of claim 1, wherein the pinch valve is configured as a scissor-type pinch valve.

7. The vacuum cleaner of claim 1, wherein the pinch valve acts on a flexible segment of the first air flow path.

8. The vacuum cleaner of claim 7, wherein the flexible segment is made of silicone.

9. The vacuum cleaner of claim 7, wherein the pinch valve comprises a first pinch bar and a second pinch bar that are configured to move towards each other to squeeze the flexible segment of the first air flow path.

10. The vacuum cleaner of claim 1, wherein a pivot between the backbone and the floor nozzle comprises a first frame portion coupled to the floor nozzle and a second frame portion coupled to the backbone, wherein the second frame portion is pivotably connected to the first frame portion, and wherein the pinch valve includes a first bar connected to the first frame portion and a second bar connected to the second frame portions.

11. The vacuum cleaner of claim 10, wherein pivoting the first frame portion with respect to the second frame portion moves the first and second bars between open and closed positions on the flexible segment.

12. The vacuum cleaner of claim 11, wherein the first bar is pivotably connected to the first frame portion via a first yoke and/or the second bar is pivotably connected to the second frame portion via a second yoke.

13. The vacuum cleaner of claim 1, wherein the air flow conduits include a flexible conduit between the dustcup and the hand nozzle.

14. The vacuum cleaner of claim 1, wherein the vacuum cleaner is powered by one or more batteries.

15. The vacuum cleaner of claim 14, wherein, during use, the one or more batteries are retained on the backbone.

16. A vacuum cleaner comprising:
a floor nozzle;
a handle;
a hand nozzle stored at least partially in the handle;
a backbone between the floor nozzle and the handle;
a motor on the backbone;
a dustcup on the backbone, the dustcup having an inlet;
a valve between the floor nozzle and the inlet to the dustcup, the valve operable between an open position and a closed position; and
air flow conduits defining a first air flow path and a second air flow path, the first air flow path between the dustcup and the floor nozzle, and the second air flow path between the hand nozzle and the dustcup and comprising a flexible conduit;
wherein, when the valve is in the open position, the first air flow path is open to the floor nozzle and, when the valve is in the closed position, the first air flow path is closed to the floor nozzle;
wherein the hand nozzle comprises
a rigid first section connected to the flexible conduit, and
a rigid second section pivotably connected to the rigid first section,
wherein the rigid second section is configured to be received in the handle in a stored configuration.

17. The vacuum cleaner of claim 16, wherein the hand nozzle includes a pivot joint between the rigid first section and the rigid second section, the pivot joint defining a passageway therethrough.

18. The vacuum cleaner of claim 16, wherein the air flow conduits include a rigid conduit connected to the handle, wherein the rigid conduit fluidly communicates with the hand nozzle via the handle when the second rigid portion is received in the handle.

19. The vacuum cleaner of claim 18, wherein an upper end portion of the backbone defines a receptacle configured to receive part of the rigid conduit so that during use the rigid conduit couples the handle to the backbone.

20. The vacuum cleaner of claim 19, wherein the receptacle defines a dead end to the second air flow path.

* * * * *